(12) United States Patent
Lomas

(10) Patent No.: US 10,729,925 B1
(45) Date of Patent: Aug. 4, 2020

(54) SPRINKLER FLOW TEST ASSEMBLY

(71) Applicant: David G. Lomas, Bakersfield, CA (US)

(72) Inventor: David G. Lomas, Bakersfield, CA (US)

( * ) Notice: Subject to any disclaimer, the term of this patent is extended or adjusted under 35 U.S.C. 154(b) by 69 days.

(21) Appl. No.: 15/661,806

(22) Filed: Jul. 27, 2017

Related U.S. Application Data

(60) Provisional application No. 62/370,844, filed on Aug. 4, 2016.

(51) Int. Cl.
| | | |
|---|---|---|
| G01F 1/00 | (2006.01) | |
| G01F 15/00 | (2006.01) | |
| A62C 37/50 | (2006.01) | |
| G01F 15/12 | (2006.01) | |
| G01F 1/05 | (2006.01) | |

(52) U.S. Cl.
CPC ............... *A62C 37/50* (2013.01); *G01F 1/00* (2013.01); *G01F 15/005* (2013.01); *G01F 15/125* (2013.01); *G01F 1/05* (2013.01)

(58) Field of Classification Search
CPC ........ G01M 3/2853; G01M 3/28; G01M 3/26; A62C 37/50; A62C 35/58; A62C 37/40; A62C 37/42; A62C 35/68; A62C 35/62; G01F 13/006; G01F 13/008; G01F 15/07; G01F 22/02; G01F 25/0007; G01F 25/0084; G01F 25/0092; G01F 15/0755; Y10S 285/911
USPC .......................... 73/149, 861.44; 222/36, 71
See application file for complete search history.

(56) References Cited

U.S. PATENT DOCUMENTS

| | | | | |
|---|---|---|---|---|
| 1,875,233 A | * | 8/1932 | Gewalt ................. | A62C 37/50 169/37 |
| 4,022,245 A | * | 5/1977 | Davis .................... | F16K 15/031 137/515.7 |
| 4,206,643 A | * | 6/1980 | Phillips .................. | G01F 1/24 250/231.1 |
| 4,356,870 A | * | 11/1982 | Gaylord ................ | A62C 35/58 126/299 R |
| 4,643,224 A | * | 2/1987 | Rung .................... | A62C 37/50 116/276 |
| 4,704,983 A | * | 11/1987 | Rung .................. | F16K 37/0058 73/323 |
| 4,729,403 A | * | 3/1988 | Roche ................... | A62C 37/50 137/559 |
| 4,945,754 A | * | 8/1990 | Wissman, Jr. ............ | G01F 1/05 73/1.28 |
| 5,018,386 A | * | 5/1991 | Zeoli ..................... | A62C 37/50 137/559 |
| 5,139,044 A | * | 8/1992 | Otten .................... | A01G 25/16 137/80 |
| 5,344,193 A | * | 9/1994 | Rio ........................ | F16L 35/00 137/312 |

(Continued)

FOREIGN PATENT DOCUMENTS

KR  100935550 B1 * 1/2010

*Primary Examiner* — Tran M. Tran
(74) *Attorney, Agent, or Firm* — R. Scott Kimsey, Esq.

(57) ABSTRACT

A flow test assembly for testing fire sprinkler systems includes a connector configured to attach to a sprinkler head orifice to be tested, a conduit downstream of the connector, a pressure gauge downstream of the conduit, and a flow totalizer downstream of the pressure gauge. Water enters the assembly through the connector to the sprinkler head and flows through the components of the assembly downstream of the connector. The water exits the system through the drainage hose.

5 Claims, 6 Drawing Sheets

(56) References Cited

U.S. PATENT DOCUMENTS

| | | | | |
|---|---|---|---|---|
| 5,390,744 A * | 2/1995 | McHugh | A62C 35/68 | 169/16 |
| 5,720,351 A * | 2/1998 | Beukema | A62C 35/62 | 169/16 |
| 5,752,540 A * | 5/1998 | Hansel, Sr. | A62C 35/68 | 137/15.16 |
| 6,076,545 A * | 6/2000 | Cooper | A62C 35/68 | 137/360 |
| 6,396,404 B1 * | 5/2002 | McHugh | A62C 35/605 | 137/557 |
| 6,681,802 B2 * | 1/2004 | McHugh | F16K 11/0873 | 137/559 |
| 6,845,784 B2 * | 1/2005 | Pascznk | A62C 99/00 | 137/312 |
| 6,848,513 B2 * | 2/2005 | Jackson | A62C 35/68 | 169/16 |
| 7,221,281 B1 * | 5/2007 | Young | A62C 35/68 | 340/606 |
| 7,237,568 B2 * | 7/2007 | Cooper | A62C 37/50 | 137/377 |
| 7,845,424 B1 * | 12/2010 | Miller | A62C 35/026 | 169/13 |
| 8,727,029 B2 * | 5/2014 | Feenstra | A62C 35/68 | 169/16 |
| 8,727,030 B2 * | 5/2014 | Feenstra | A62C 35/68 | 137/597 |
| 9,022,132 B2 * | 5/2015 | Feenstra | A62C 35/68 | 169/16 |
| 9,199,107 B2 * | 12/2015 | Kjellberg | A62C 31/07 | |
| 9,205,293 B2 * | 12/2015 | Grenning | A62C 37/50 | |
| 9,265,980 B2 * | 2/2016 | Johnson | A62C 35/68 | |
| 9,355,062 B2 * | 5/2016 | Marshall | A62C 37/50 | |
| 9,375,595 B2 * | 6/2016 | Taylor | A62C 35/64 | |
| 9,415,250 B2 * | 8/2016 | Bucher | A62C 35/62 | |
| 9,683,668 B2 * | 6/2017 | Ringer | F16K 11/048 | |
| 9,776,028 B2 * | 10/2017 | Feenstra | A62C 35/645 | |
| 10,413,766 B2 * | 9/2019 | Mete | A62C 35/64 | |
| 10,426,983 B2 * | 10/2019 | Hennegan | A62C 35/68 | |
| 2005/0284644 A1 * | 12/2005 | MacDonald, III | A62C 35/60 | 169/5 |
| 2016/0151654 A1 * | 6/2016 | Mete | A62C 35/64 | 169/37 |
| 2016/0310772 A1 * | 10/2016 | Tabor | A62C 35/68 | |
| 2017/0043997 A1 * | 2/2017 | Scott | B67D 7/16 | |

* cited by examiner

SPRINKLER FLOW TEST ASSEMBLY

RELATED APPLICATIONS

This application claims priority of U.S. Provisional Patent Application No. 62/370,844, filed Aug. 4, 2017 and entitled "Sprinkler Flow Test Assembly."

BACKGROUND AND FIELD

1. Field

The present disclosure relates generally to the field of flow test meters, and more specifically to a flow test meter for use with fire sprinkler systems in buildings.

2. Background

Residential fire sprinkler systems in many jurisdictions are tested after installation to ensure that they have been installed properly, are operating properly, and comply with standards set forth in section 13D of the Codes and Standards of the National Fire Protection Association. Currently, this testing is performed using a method known as the "bucket test," which is typically used to test one or two separate sprinkler heads in a given system simultaneously. In order to test a sprinkler using the bucket test, the entire system must first be turned off and drained of water. The most hydraulically demanding sprinkler (typically, the most remote sprinkler with respect to the water source) in the structure is then located and the sprinkler head removed. The flow test assembly is then attached to the sprinkler head orifice. The flow test assembly typically consists of a shut-off valve, a pressure gauge installed immediately downstream of the shut-off valve, a length of rigid pipe to act as a conduit, a sprinkler test head, and a bucket typically marked in one-gallon increments.

Once the sprinkler system is turned off and drained, and the flow test assembly is attached, the sprinkler system is charged and filled with the shut-off valve of the test assembly in the closed position. The valve is then opened and water allowed to flow through the system until all of the air has been removed from the system. After the air has been purged, the shut-off valve is once again closed, and the test bucket removed for emptying, it is again placed under the sprinkler test head. The valve is again opened, and water is allowed to flow for a timed period (for example, one minute). The flow rate of the system is calculated by measuring the volume of water that flows into the bucket in a given period of time. The pressure gauge included with the test assembly displays residual pressure during the flow test and indicates whether adequate pressure is available for the sprinkler head rating.

The current method of testing the flow of sprinkler systems within a building has been in use for many years and suffers from a series of problems. Debris located within the sprinkler system, particularly right after construction, affects the flow of fluid and can become lodged at the sprinkler head during an actual fire activation. Variations in bucket markings or construction of the bucket can also lead to erroneous test results. The bucket test uses more water than is desirable because the system must be drained twice—once to relieve the water pressure so as to install the test heads and a second time to reinstall the permanent heads. The accumulation of water in the bucket is typically heavy enough that disposal of the water carries a risk of back or other injury.

SUMMARY OF THE DISCLOSURE

A flow test assembly for testing fire sprinkler systems includes a connector configured to attach to a sprinkler head orifice to be tested, a conduit downstream of the connector, a pressure gauge downstream of the conduit, and a flow totalizer downstream of the pressure gauge. Water enters the assembly through the connector to the sprinkler head orifice and flows through the components of the assembly downstream of the connector, which are in fluid communication with one another. The water exits the system through the drainage hose.

One embodiment of the flow test assembly further includes a filter positioned between the conduit and the pressure gauge. The filter is surrounded by a sight tube that extends around the filter. The first end of the transparent conduit is attached to the conduit and the second end of the sight tube is attached to the housing of the pressure gauge.

Another embodiment of the flow test assembly includes a filter within the conduit for filtering debris flowing through the conduit.

Another embodiment of the flow test assembly includes a control valve positioned between the pressure gauge and the flow totalizer, and in fluid communication with each, for controlling fluid flow therebetween.

In another embodiment of the flow test assembly the conduit and drainage hose are flexible.

In another embodiment of the flow test assembly, a sprinkler test head is positioned between the flow totalizer and the drainage hose, and in fluid communication with each.

In another embodiment of the flow test assembly, the internal diameter of the sprinkler test head is identical to that of a sprinkler head to be used with the sprinkler head orifice being tested.

In another embodiment of the flow test assembly, the filter is an internal strainer.

In another embodiment of the flow test assembly, the conduit is a first conduit, and a second conduit is disposed between the first conduit and the pressure gauge. A removable filter is disposed within the second conduit.

In another embodiment of the flow test assembly, the removable filter includes an o-ring so that the removable filter is maintained in sealing engagement with an interior wall of the second conduit.

Another aspect of the present disclosure provides a flow test assembly having an upper connector, a conduit downstream of the upper connector, a pressure gauge downstream of the conduit, a flow totalizer downstream of the pressure gauge, and an outlet downstream of the flow totalizer. Water enters the upper connector from a sprinkler head orifice and flow through components of the assembly downstream thereof, which are in fluid communication, and exits the flow assembly via the outlet.

In another embodiment of the flow test assembly, the outlet includes a fitting configured to receive a sprinkler test head.

In another embodiment of the flow test assembly, a sprinkler test head is removably attached to the fitting.

In another embodiment of the flow test assembly, a control valve is disposed between the pressure gauge and the flow totalizer, and in fluid communication with both.

In another embodiment of the flow test assembly, the upper connector is a first upper connector, and the flow test assembly includes a shut-off valve upstream of the first upper connector and a second upper connector upstream of the shut-off valve. The second upper connector is configured for removable attachment to a sprinkler head orifice.

Another aspect of the present disclosure provides a flow test assembly having an upper connector, a conduit attached to the upper connector downstream thereof, a sight tube attached to the conduit downstream thereof, a pressure gauge removably attached to the sight tube downstream thereof, a control valve attached to the pressure gauge downstream thereof, a flow totalizer attached to the control valve downstream thereof, and a sprinkler test head fitting attached to the flow totalizer downstream thereof. A removable filter is disposed within the sight tube. The sprinkler test head fitting is configured to receive a sprinkler test head removably attached thereto.

In another aspect of the present disclosure, a flow test assembly includes a first watertight fitting downstream of the flow totalizer and in fluid communication with the flow totalizer. The first watertight fitting is configured to mate with a second watertight fitting, and the first and second watertight fittings are configured to retain a removable sprinkler test head between them when mated.

In another aspect of the present disclosure, a flow test assembly includes a drainage hose downstream of the flow totalizer and in fluid communication therewith.

DETAILED DESCRIPTION

Figure 1:
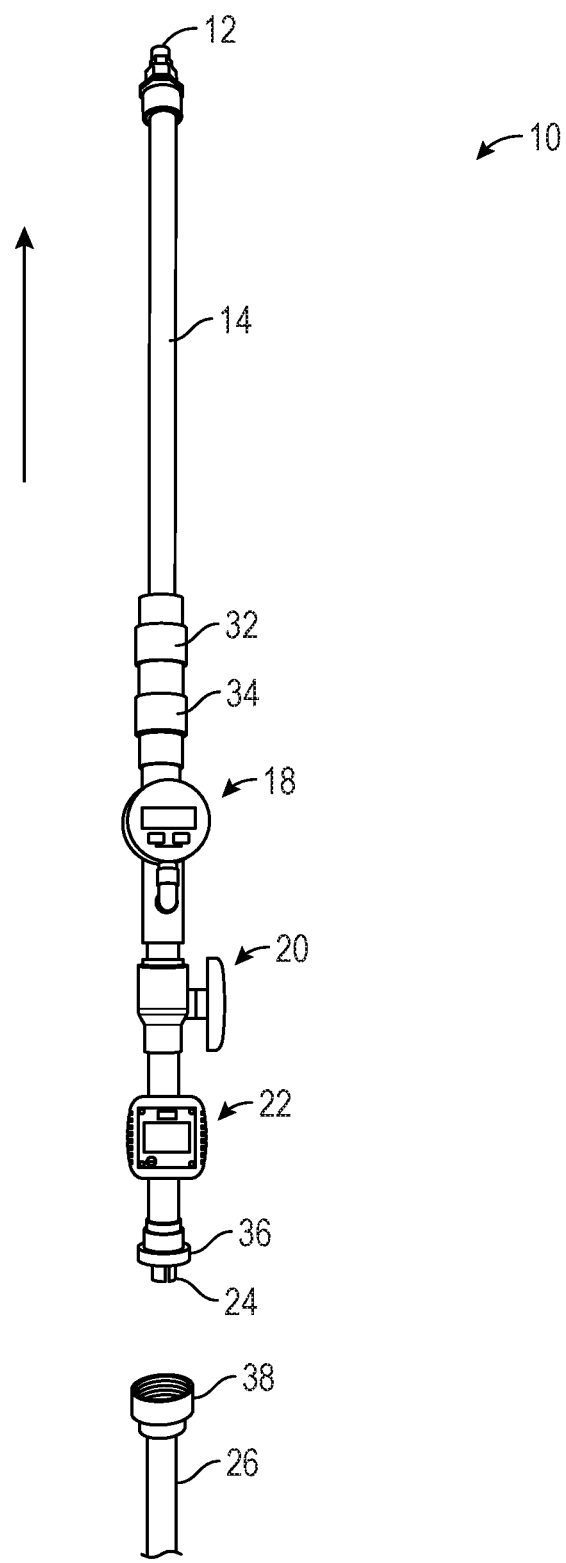
FIG. 1 is a perspective view of one embodiment of a flow test assembly of the present disclosure.

Turning now to the drawings, wherein like numerals indicate like parts, FIG. 1 depicts one embodiment of a flow test assembly 10 constructed in accordance with the teachings of the present invention. The embodiment of flow test assembly 10 shown in FIG. 1 includes a connector 12, conduit 14, internal strainer 16 (shown in FIG. 3), pressure gauge 18, control valve 20, flow totalizer 22, sprinkler test head orifice 24, and drainage hose 26.

Figure 2:
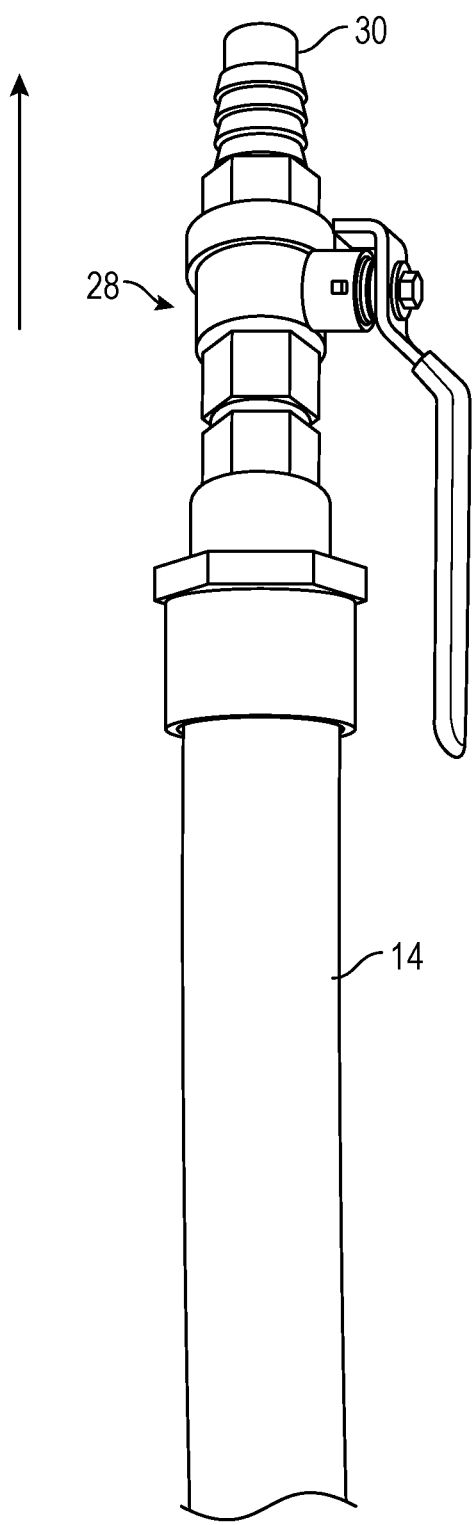
FIG. 2 is a perspective view of an upper portion of one embodiment of a flow test assembly of the present disclosure.

FIG. 2 provides a close view of a portion of flow test assembly 10 near the "top" of the device (that is, the end of flow test assembly 10 that attaches to a sprinkler head orifice in a structure when the flow test assembly is in use; the terms "top" or "upper," as used herein, refer to this end of the flow test assembly, or in this direction along the device. Arrows provided in various figures point toward the upper end of the device).

In the embodiment of flow test assembly 10 shown in the drawings, connector 30 is a threaded connector that mates with the sprinkler head orifice to be tested. This orifice is typically a threaded connector onto which a sprinkler head is mated during normal use of the sprinkler system. Although the present disclosure may refer to testing of the orifice, it is to be understood that the sprinkler system itself is being tested, and the sprinkler head orifice used as an interface for the flow test assembly disclosed herein. A shut-off valve 28 (such as, for example, a ball valve) is provided directly downstream of connector 30. It should be understood that flow test assembly 10 may be provided with connector 30 and shut-off valve 28, or may be provided as shown in FIG. 1, the upper end of flow test assembly 10 terminating in connector 12. The latter embodiment may be provided in circumstances where a contractor has already installed a connector 30 and shut-off valve 28 into the sprinkler head orifice in anticipation of the necessary flow testing. This allows the sprinkler system to be charged with water up to the ball valves, and therefore the system does not have to be shut down and drained, as is the case with the bucket test. In such cases, a user of flow test assembly 10 simply connects connector 12 to the contractor's shut-off valve 28 prior to beginning the test. Connector 12 is preferably threaded onto the ball valve and control valve 20 (described below) of the present flow test assembly may be opened to purge air from the flow test assembly. Extending downward from shut-off valve 28, and attached thereto via connector 12, is a conduit 14. Conduit 14 is preferably constructed of a flexible material and allows a user of the present device to adjust the device clear of obstructions, which may be located below the device.

Figure 3:
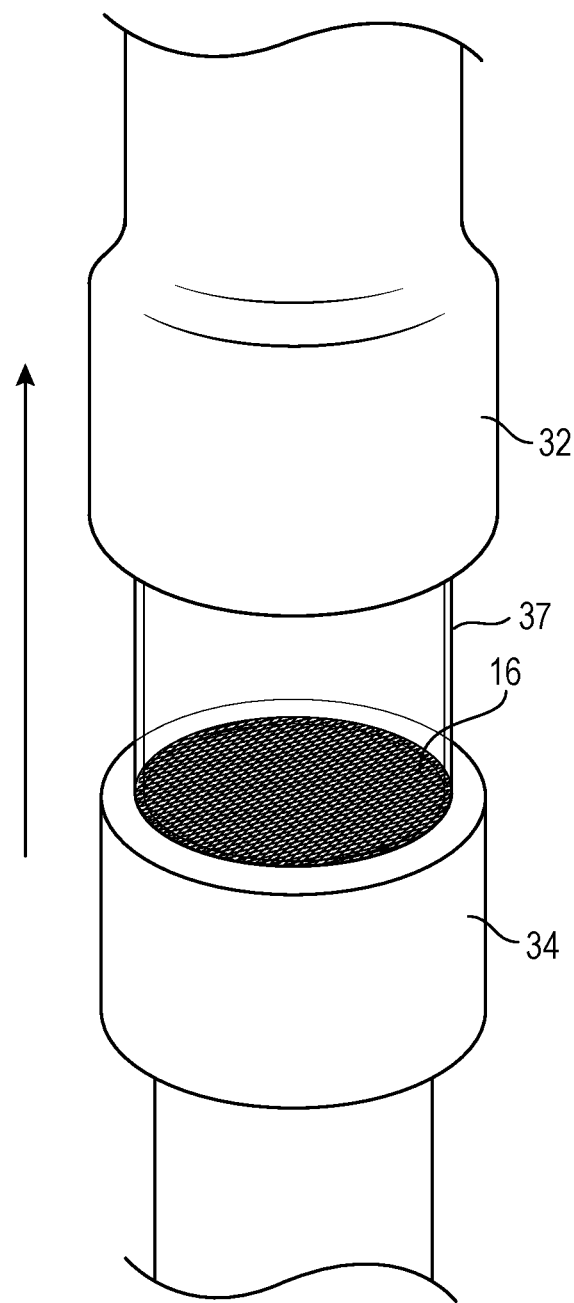
FIG. 3 is a perspective view of an internal strainer of one embodiment of a flow test assembly of the present disclosure.

At the lower end of conduit 14 an internal strainer 16 may be provided, as shown in FIG. 3. Internal strainer 16 is preferably constructed of steel mesh or similar material, though any suitable straining or filtering structure may be utilized. The conduit 37 surrounding, and upstream of, internal strainer 16 is preferably clear, creating a sight tube that allows visual examination of the strainer and the area immediately upstream thereof. In the embodiment of flow test assembly 10 shown in FIG. 3, internal strainer 16 is flanked by fittings 32 and 34. Fitting 32 connects conduit 37 around and upstream of internal strainer 16 to conduit 14, while fitting 34 connects conduit 37 around internal strainer 16 to downstream components of the device, described below. It is contemplated that in some embodiments of flow test assembly 10, internal strainer 16 may be positioned within conduit 14.

Figure 4:
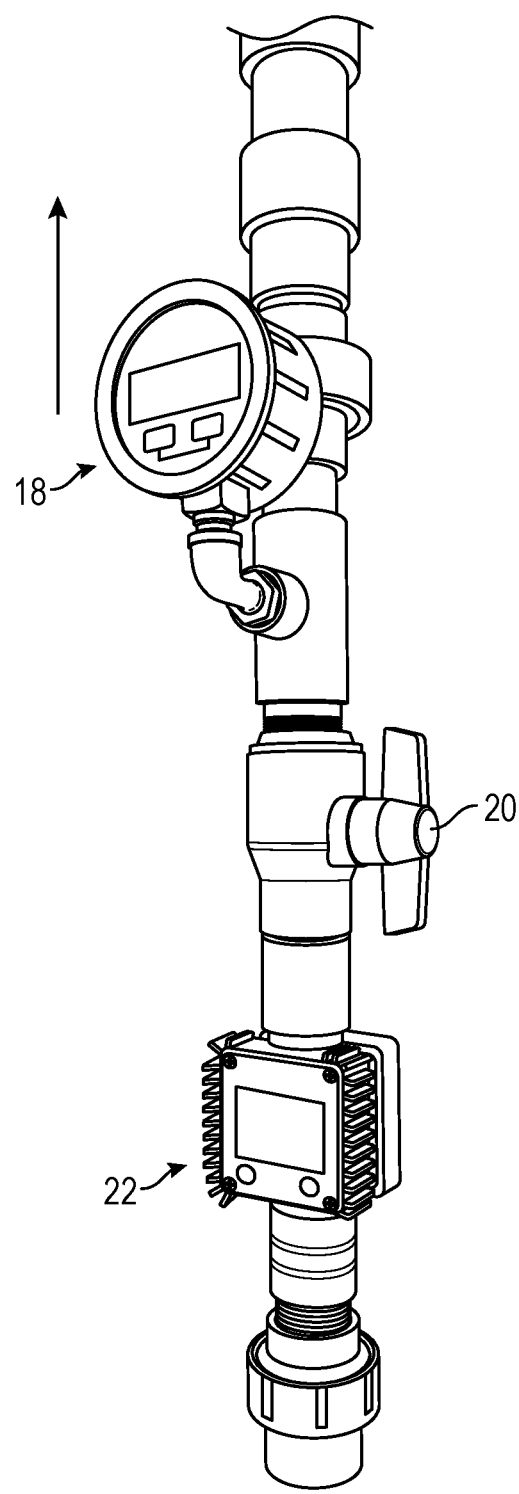
FIG. 4 is a perspective view of a pressure gauge, control valve, and flow totalizer of one embodiment of a flow test assembly of the present disclosure.

Downstream of internal strainer 16, as depicted in FIG. 4, are, in series, pressure gauge 18, control valve 20, and flow totalizer 22. One example of a pressure gauge 18 suitable for use with the present flow test assembly is a DPGWB-08 0.5% digital pressure gauge, manufactured by Dwyer Instruments, Inc. (Michigan City, Ind., US). Control valve 20, as shown in the drawings, is a quarter-turn ball valve. One example of a flow totalizer 22 suitable for use with the present flow test assembly is a Model 32ZN69 digital turbine flow meter, manufactured by Dayton Electronic Mfg. Co. (Lake Forest, Ill., US). It is to be understood that any suitable pressure gauge, control valve, or flow meter may be used in with the flow test assembly in accordance with the principles of the present disclosure. Pressure gauge 18, control valve 20, and flow totalizer 22 may each include their own separate housings, and may be connected as shown in the figures in any suitable manner. Alternatively, some embodiments of flow test assembly 10 may include a single structure that includes the pressure gauge, control valve, and flow totalizer, with a single, continuous housing defining a flow path through each.

Figure 5:
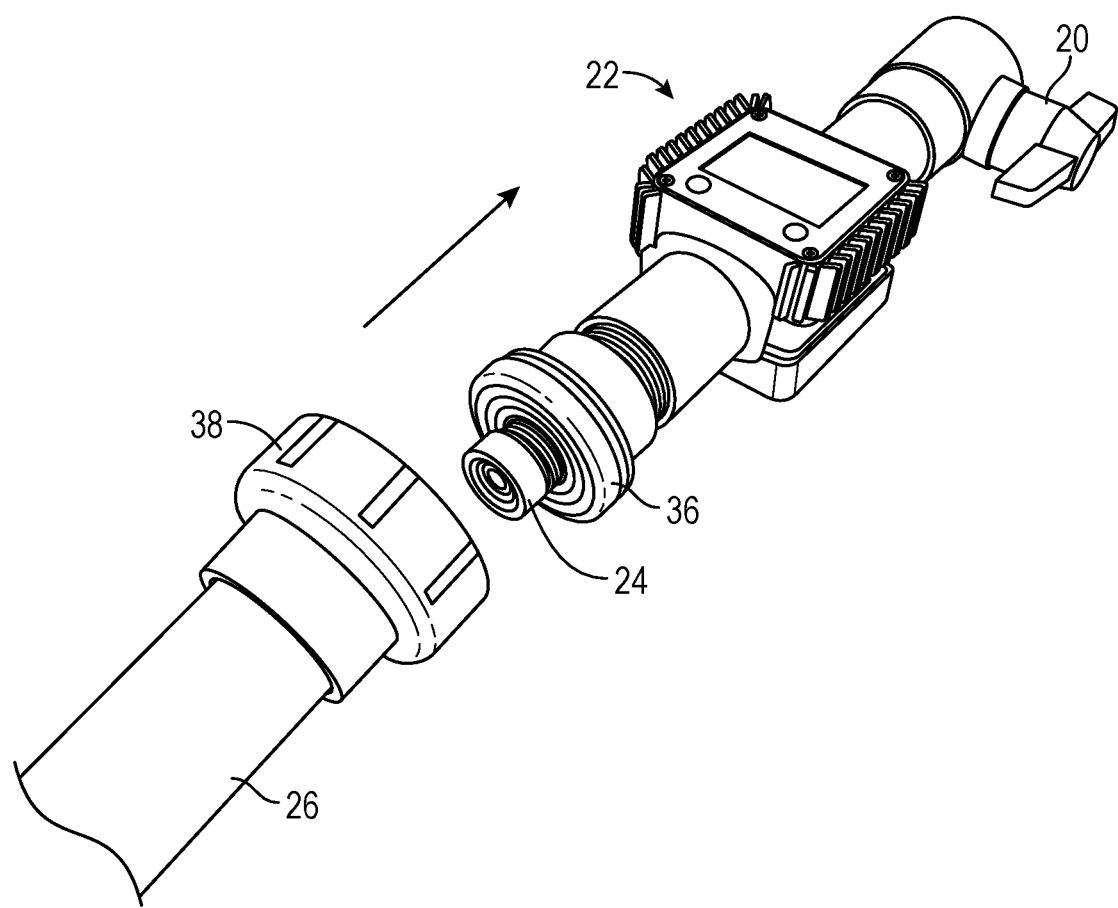
FIG. 5 is a perspective view of a sprinkler head and fittings for attachment of a drainage hose to one embodiment of a flow test assembly of the present disclosure.

FIG. 5 depicts a portion of flow test assembly 10 immediately downstream of flow totalizer 22. A sprinkler test head orifice 24 is affixed to the device via a fitting 36, which mates with fitting 38 affixed to drainage hose 26. Drainage hose 26 extends away from the other components of flow test assembly 10, as shown in FIG. 1, and may be of any suitable or desired length. It should be noted that sprinkler test head orifice 24 can enclose a removable sprinkler test head between watertight fittings 36 and 38. The orifice downstream of the flow totalizer, at or near fitting 36, is configured to allow the appropriate K-Factor sprinkler test head to be threaded into flow test assembly 10.

In use, it is preferred that two separate heads (or orifices therefor) of a sprinkler system are tested simultaneously. The following description applies to each head. Connector 12 is affixed to a ball valve installed in place of a sprinkler head in the line to be tested (or, alternatively, in embodiments of the flow test assembly 10 that include a ball shut-off valve 28 and connector 30, connector 30 is attached to the sprinkler head orifice being tested). As opposed to the bucket test, in which sprinkler heads to be tested are identified at the time of testing and the necessary components of the test attached to the sprinkler head orifices, the present flow test assembly 10 allows a contractor to have necessary structure, such as ball valves, installed and ready for testing when the inspector arrives. The ball shut-off valve 28 and control valve 20 are opened to purge air from flow test assembly 10. Draining of the sprinkler system, as required by the bucket test, is not required when using flow test assembly 10. After air has been purged from flow test assembly 10, ball shut-off valve 20 is closed and the static pressure indicated on pressure gauge 18 is recorded.

Once the static pressure has been recorded, testing of the sprinkler line begins by opening control valve 20. The residual reading of pressure gauge 18 is recorded. The residual reading can be compared to known hydraulic pressure required for a given sprinkler head to flow at its designed gallons per minute (GPM). In most cases, a sprinkler head will flow at the designed GPM, however if there is a problem with the supply of water to the sprinkler head, or with the engineering of the sprinkler system, the system may not flow at the designed GPM. For example, a sprinkler head with a K factor of 4.9 may cover an area of 16×16 square feet provided that the head has pressure of at least 7.0 PSI. The present flow test assembly 10 may indicate a residual pressure of only 5.0 PSI, in which case the user will know that the pressure in the system is insufficient and can begin to troubleshoot. If the pressure reading is acceptable, water is allowed to flow through flow test assembly 10 for one minute, after which time ball shut-off valve 28 and control valve 20 are closed and the reading from flow totalizer 22 is recorded. Although it is preferred that water flow through flow test assembly 10 for one minute, it is contemplated that other time periods may be utilized, with the appropriate calculations performed to determined rate of flow over a given period of time.

After the test has been conducted, the riser valve at the water main is closed, and the drain valve at the water main is opened. Ball shut-off valve 28 and control valve 20 are both opened, allowing overhead piping water to drain from the sprinkler system through the drain valve at the water main and through drainage hose 36. After drainage is complete the flow test assembly 10 and associated drainage hose 26 are removed and the sprinkler head installed into the sprinkler system. The drain valve at the water main is closed and the riser valve at the water main opened.

The flow test assembly 10 described herein accurately tests the fire sprinkler system, preferably using a digital flow totalizer. The user of flow test assembly 10 can use the assembly to verify compliance with NFPA 13D flow requirements. Relying on the less reliable bucket test is no longer required. Further, because the present flow test assembly 10 requires the sprinkler system to be drained only after testing, rather than both before and after testing as required by the bucket test, the present assembly saves time and reduces water wastage.

Internal strainer 16 is capable of catching debris, such as small rocks, excess pipe glue, pipe shavings, and the like that may be present within the sprinkler system. The conduit around internal strainer 16 is preferably transparent, allowing a user of the present assembly to visualize debris during the flow test, and to detect air within the system. Debris caught by strainer 16 can affect sprinkler head discharge, and debris such as that mentioned above indicates that the system was not properly installed. Strainer 16 also prevents the debris from entering the area of the pressure gauge and the flow totalizer and affecting those instruments.

The present assembly eliminates the need for the bucket used with the standard bucket test, and thereby eliminates the need for carrying up to 133 pounds in order to dispose of the water contained within a typical test bucket. Instead of draining to a bucket, drainage hose 26 is of adequate length to drain water outside of the structure during testing. The hose may, for example, divert water out a door or window to a suitable location external to the structure. The flexibility of the various hoses, tubes, and the like associated with the present assembly also allows the present assembly to be used beneath sprinkler heads even when obstacles are present beneath the heads. The flexible nature of the assembly allows it to be positioned in such a manner as to avoid the obstacles. By contrast, the bucket test requires that obstacles beneath the test heads be removed, or that the bucket be placed on top of the obstacle(s).

One advantage of the present flow test assembly is that it can be utilized prior to installation of the sprinkler heads onto the sprinkler system. The existing bucket test, on the other hand, requires that the sprinkler heads be installed, then removed, then reinstalled. The single installation of the sprinkler heads, followed by torqueing according to manufacturer specifications, avoids potential problems associated with installation, removal, and reinstallation of the sprinkler heads, such as loss of watertight ability and the like.

The present flow test assembly also aids in troubleshooting in the event a sprinkler system does not pass the flow test. The readings provided by the present system provide more accurate information on which to base troubleshooting than the traditional bucket test.

Figure 6:
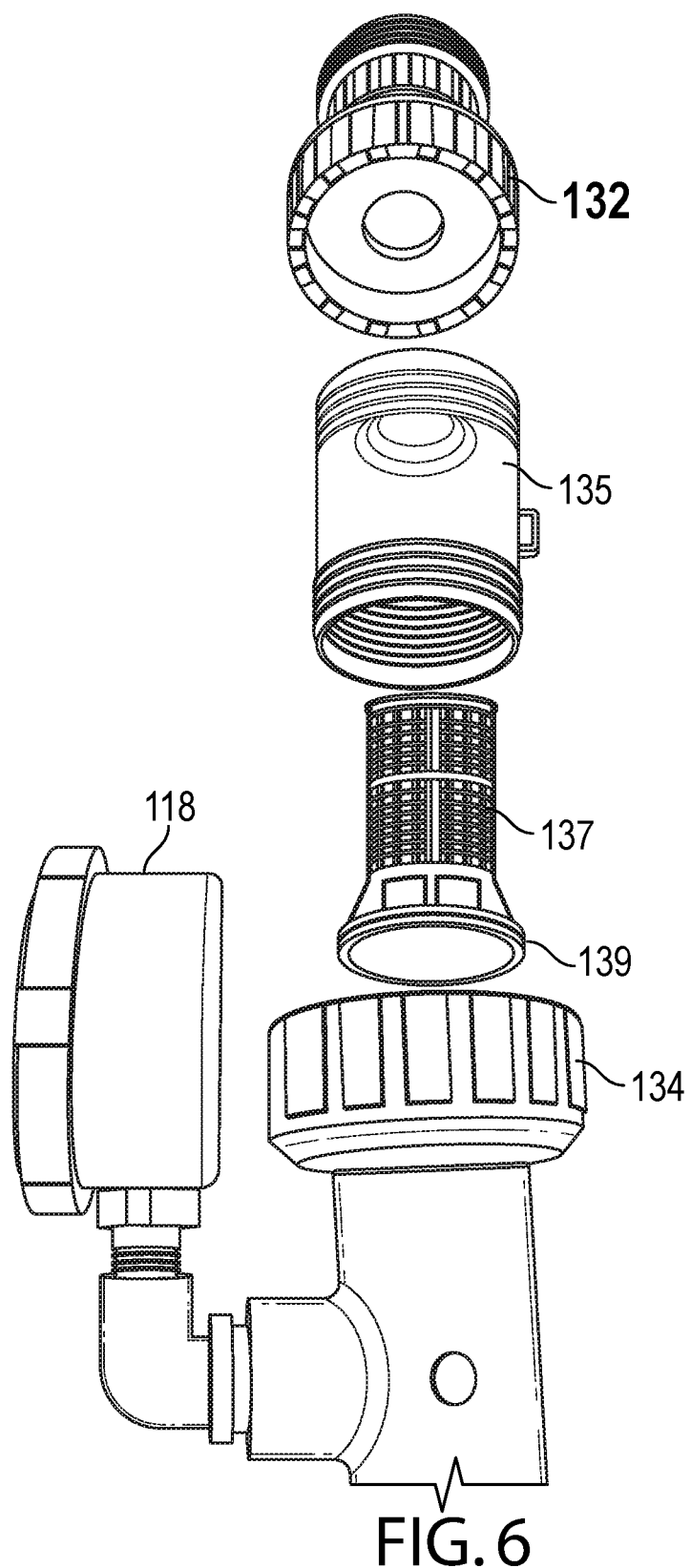
FIG. 6 is an exploded perspective view of one embodiment of a flow test assembly of the present disclosure having a removable filter associated therewith.

FIG. 6 is an exploded perspective view of one embodiment of the present flow test assembly having removable filter 137 instead of strainer 16. Removable filter 137 is preferably constructed from a synthetic polymer, but may be constructed from any suitable material. An o-ring 139 may be provided as shown in the figure so that removable filter 137 is sealed at the end of sight tube 135 adjacent fitting 134. Sight tube 135 allows a user of the flow test assembly to visually inspect removable filter 137 in order to determine whether the filter requires cleaning. The user can also determine if the test needs to be stopped and the system flushed of excess debris. To clean the filter, the user simply unscrews sight tube 135 from fitting 134 and manually removes filter 137. After cleaning, the filter is reinserted manually by the user firmly pushing the filter into place.

The remaining components shown in FIG. 6 operate as described above with respect to other embodiments of a flow test assembly of the present disclosure. Components of the present flow test assembly are preferably constructed from schedule 80 materials, which have a greater wall thickness than, for example, schedule 40 materials, and are therefore able to withstand greater water pressures. It is contemplated, however, that for any given embodiment of the present flow test assembly, the thickness of materials, type of materials, water resistance or proofing, pressure rating, or other such criteria may be varied as suitable for any given use of the flow test assembly.

The foregoing description and accompanying drawings are illustrative of certain embodiments of the present disclosure and are not intended to be limiting. Various modifications to the present disclosure may be apparent to those of skill in the art upon reading this disclosure. Although the present flow test assembly is shown as having various components connected by fittings, it is contemplated that some or all of the components may be provided as a single, continuous construction. Any suitable combination of fixed and detachable components, or a single fixed device, may be utilized according to the principles disclosed herein. These are other modifications are considered to fall within the spirit and scope of the present disclosure

Having thus described the preferred embodiment of the invention, what is claimed as new and desired to be protected by Letters Patent includes the following:

1. A flow test assembly for testing fire sprinkler systems, the flow test assembly comprising:
    a connector configured to attach to a sprinkler head orifice to be tested;
    a conduit downstream of said connector and in fluid communication therewith;
    a pressure gauge downstream of said conduit and in fluid communication therewith;
    a flow totalizer downstream of said pressure gauge and in fluid communication therewith;
    a filter positioned between the conduit and the pressure gauge, and in fluid communication with the conduit and the pressure gauge, and in fluid communication with the conduit and the pressure gauge; and
    a sight tube around the filter, the sight tube having a first end attached to the conduit and a second end attached to a housing of the pressure gauge, wherein water entering the connector from the sprinkler head orifice to be tested flows through the components of the assembly downstream thereof and exits the assembly downstream of said flow totalizer.

2. The flow test assembly according to claim 1, further comprising a control valve positioned between the pressure gauge and flow totalizer, and in fluid communication with the pressure gauge and flow totalizer, for controlling fluid flow therebetween.

3. The flow test assembly according to claim 1, wherein the filter is an internal strainer.

4. A flow test assembly for testing fire sprinkler systems, the flow test assembly comprising: an upper connector; a conduit downstream of said upper connector and in fluid communication therewith; a pressure gauge downstream of said conduit and in fluid communication therewith; a flow totalizer downstream of said pressure gauge and in fluid communication therewith; a control valve disposed between said pressure gauge and said flow totalizer, and in fluid communication with said pressure gauge and said flow totalizer; and an outlet downstream of said flow totalizer and in fluid communication therewith.

5. A flow test assembly for testing fire sprinkler systems, the flow test assembly comprising:
    an upper connector;
    a conduit attached to said upper connector downstream thereof, and in fluid communication therewith;
    a sight tube attached to said conduit downstream thereof, and in fluid communication therewith;
    a removable filter disposed within said sight tube;
    a pressure gauge removably attached to said sight tube downstream thereof, and in fluid communication therewith;
    a control valve attached to said pressure gauge downstream thereof, and in fluid communication therewith;
    a flow totalizer attached to said control valve downstream thereof, and in fluid communication therewith; and
    a sprinkler test head fitting attached to said flow totalizer downstream thereof, and in fluid communication therewith,
wherein said sprinkler test head fitting is configured to receive a sprinkler test head removably attached thereto.

* * * * *